United States Patent [19]

Andres et al.

[11] Patent Number: 4,702,492
[45] Date of Patent: Oct. 27, 1987

[54] SEAT BELT SYSTEM FOR VEHICLES

[75] Inventors: Rudolf Andres, Sindelfingen; Heinz Knoll, Stuttgart; Volker Petri, Aidlingen; Harald Pfistner, Stuttgart, all of Fed. Rep. of Germany

[73] Assignee: Daimler-Benz Aktiengesellschaft, Stuttgart, Fed. Rep. of Germany

[21] Appl. No.: 851,814

[22] Filed: Apr. 14, 1986

[30] Foreign Application Priority Data

Apr. 13, 1985 [DE] Fed. Rep. of Germany ....... 3513339

[51] Int. Cl.$^4$ ............................................. A62B 35/02
[52] U.S. Cl. .................................... 280/801; 280/805
[58] Field of Search ............... 280/801, 802, 803, 805, 280/806, 808; 297/484, 486

[56] References Cited

U.S. PATENT DOCUMENTS

| 3,438,674 | 4/1969 | Radke et al. | 280/805 |
| 3,929,348 | 12/1975 | Lawwill | 280/805 |
| 4,158,403 | 6/1979 | Peter | 280/805 |
| 4,374,594 | 2/1983 | Kawaharazaki | 280/801 |
| 4,381,086 | 4/1983 | Pfeiffer | 280/805 |
| 4,569,535 | 2/1986 | Haglund et al. | 280/801 |
| 4,620,721 | 11/1986 | Scholz et al. | 280/801 |

FOREIGN PATENT DOCUMENTS 3020505 12/1981 Fed. Rep. of Germany.

Primary Examiner—Richard A. Bertsch
Attorney, Agent, or Firm—Barnes & Thornburg

[57] ABSTRACT

A seat belt system is disclosed having a triggering element that is set to a certain deceleration value and the signal of which, via a lock switch that is opened when the latch of the seat belt is engaged and via a pull switch closing at a certain pulling force that is applied to the seat belt by the user, triggers one indicating element respectively, such as a fuse, according to the position of the switches. The lock switch and the pull switch as well as the indicating elements are inaccessibly arranged in the belt buckle. From the combination of triggered or untriggered indicating elements, it can be concluded whether the seat belt was put on functionally correctly or had not been put on and whether manipulations took place at the belt buckle by means of electrical signals or mechanical forces.

11 Claims, 3 Drawing Figures

SEAT BELT SYSTEM FOR VEHICLES

BACKGROUND AND SUMMARY OF THE INVENTION

This invention relates to a seat belt system for vehicles of the type having a selectively engageable belt latch on buckles, and an accident indication device for generating an electrical signal in the event of deceleration forces indicating an accident. A system of this type was described in German Publish Unexamined Application No. (DE—OS) 30 20 505 published Dec. 10, 1981 in West Germany.

After accidents, the question is often raised as to whether the occupants of the vehicle had put on the seat belt in a functionally correct way or whether they had not put it on or whether there has a manipulation or tampering. In the case of active systems (belt tighteners), it is also of interest whether this system was triggered or not. By means of the known system, it can be determined only whether the buckle latch was latched in the belt buckle. However, this may also be the case when the occupant is not wearing the seat belt in a functionally correct way and is sitting on the latched seat belt.

The response to these questions is very important in the case of a reconstruction of an accident, in the case of medical experts' reports and for the purpose of court proceedings.

It is therefore an objective of this invention to further develop a seat belt system of the known type so that information can be obtained as to whether an accident took place with corresponding severity, whether the belt had been worn functionally correctly, but also whether manipulations took place in order to misrepresent this condition.

According to the invention, this objective is achieved by providing lock closure indicating switch means movable between open and closed positions in dependance on whether said belt latch is locked; first electrical indicating means arranged in series with the lock closure indicating switch means and the accident indicating electrical signal generating means; belt tension indicating switch means movable between open and closed positions in dependence on belt tension forces exceeding a predetermined valve corresponding to forces experienced when a passenger is retained by the seat belt during a vehicle accident; and second electrical indicating means arranged in series with the belt tension indicating switch means and the accident indicating electrical signal generating means in parallel to the lock closure indicating switch means and first electrical indicating means. In certain preferred embodiments the indicating elements are melt through fuses. Other embodiments utilize Coulomb cells. Depending on which of the two indicating elements has responded, exact information can be obtained on the past history when, after an accident, the belt latch mechanisms are secured and examined.

Further developments of preferred embodiments of the invention provide further electrical indicating means in parallel to the respective first and second electrical indicating means, to thereby enhance the number of possible different safety belt usage situations that can be monitored in an after-accident inspection.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
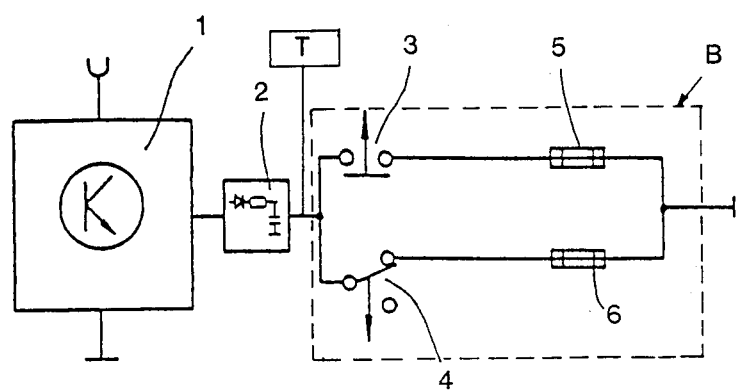
FIG. 1 is a schematic circuit diagram of portions of a safety belt system condition detection circuit constructed in accordance with a first preferred embodiment of the invention having two indicating elements.

FIG. 1, in diagram form, shows a triggering element 1 that comprises deceleration sensor that is known per se, which sensor is set at a certain deceleration value, such as 4g, and is supplied by the vehicle voltage. The deceleration sensor includes electronic or mechanical sensing means and in the case of a deceleration that is greater than a predetermined value, emits an electrical signal that is led via a low-pass filter 2 and is thus integrated. The signal that appears at the output of the electronic system may, for example, be led to a belt tightener T that is shown schematically in FIG. 1, the details of which tightener not being of interest here. The signal is also led in parallel to the inputs of two switches 3, 4 that are both inaccessibly housed in the belt buckle B that is schematically shown in dash lines.

Switch 3 is a pull switch that is set to a predetermined pulling force of, for example, 250 kg, acting between the latched buckle latch of the seat belt B and the seat belt buckle switch 3 closes in the case the predetermined pulling force is exceeded when acted on by means of the user's "mass" acting on the seat belt during an impact.

Switch 4 is a lock switch that is closed in the inoperative condition and is opened when the latch is latched in the belt buckle. The signal reaches the negative pole of the vehicle voltage source when the respective switches 3 and 4 are closed via respective safety fuse 5, 6. Fuses 5, 6 are dimensioned in such a way that, when the associated switch is closed, they melt through when an output signal of the low-pass filter 2 occurs that reaches a certain voltage value.

The following Table 1 shows all conceivable cases, "0"

TABLE 1

| | Fuse | | An Accident with a Vehicle Deceleration 4g | |
|---|---|---|---|---|
| | 5 | 6 | Occurred | Did Not Occur |
| (a) | 0 | 0 | latch inserted belt not properly put on | allright; readiness |
| (b) | 0 | 1 | belt had not been put on | manipulated |
| (c) | 1 | 0 | belt was put on | manipulated |
| (d) | 1 | 1 | belt was not put on; subsequently manipulated | manipulated |

When an accident has taken place that causes a triggering signal at the output of the low-pass filter, the case d cannot occur because only one fuse can melt—case b or c.

When no accident (<4g) has taken place, the cases b, c and d cannot occur because in this case, no fuse can melt. In the mentioned cases, it must therefore be assumed that improper or inadmissible manipulations have been carried out.

Figure 2:
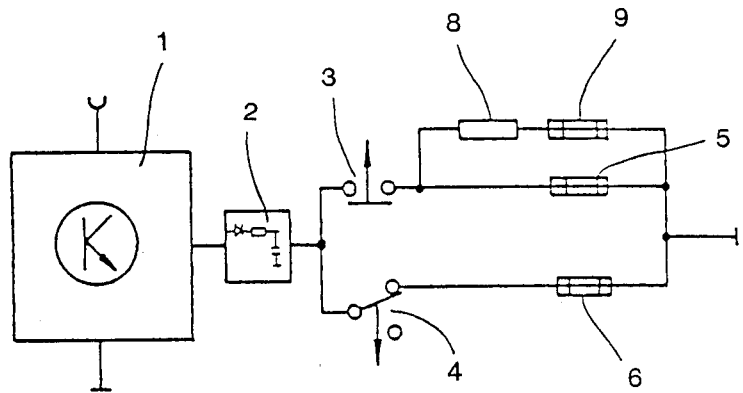
FIG. 2 is a schematic circuit diagram of portions of a safety belt system condition detection circuit constructed in accordance with a second preferred embodiment of the invention having three indicating elements.

In order to be able to recognize such cases even better, in FIG. 2, a series connection of a third fuse 9 and of a resistor 8 is arranged in parallel to the fuse 5; the remainng circuit corresponds to that of FIG. 1. The fuse 9, in connection with the resistor 8, has a longer response time to destruction; it therefore reacts "sluggishly". In this case, the response time is calculated in such a way that, in the case of a signal duration occurring during an accident, only fuse 5 can melt but not fuse 9. This is destroyed only in the case of a longer lasting signal, for example, in the case of a manipulation with the positive potential of the vehicle voltage. Thus, in case c according to Table 1, it can be judged better whether the seat belt had actually been put on or whether this case was manipulated.

Figure 3:
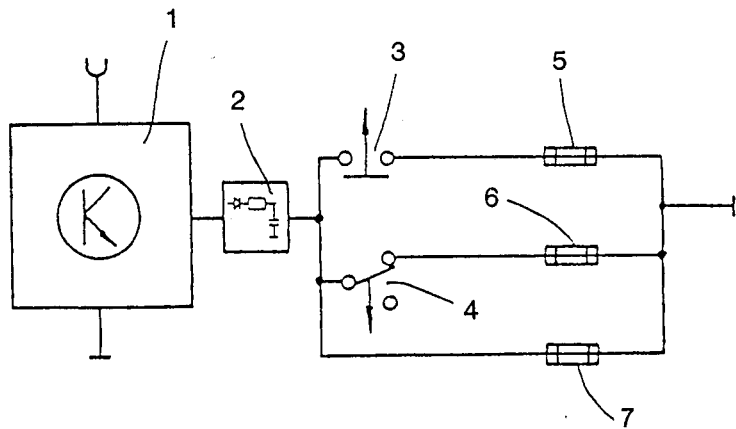
FIG. 3 is a schematic circuit diagram of portions of a safety belt system condition detection circuit constructed in accordance with a third preferred embodiment of the invention also having three indicating elements.

FIG. 3 finally shows a circuit according to FIG. 1 in which, in parallel to the series connection consisting of the lock switch 4 and the fuse 6, an additional fuse 7 is arranged. This fuse 7 melts in every case when a corresponding output signal of the low-pass filter 2 is present, irrespective of the position of the switches. The fuse 9 and the resistor 8 according to FIG. 2 were not taken into account here, but may be arranged in addition.

The possible cases are listed by means of the following Table 2, an intact fuse again being indicated by a "0" and a melted fuse by a "1".

TABLE 2

| | Fuse | | | An Accident with a Vehicle Deceleration 4g | |
|---|---|---|---|---|---|
| | 7 | 6 | 5 | Occurred | Did Not Occur |
| (a) | 0 | 0 | 0 | triggering element defect plug not inserted | allright; readiness |
| (b) | 0 | 0 | 1 | manipulated | manipulated |
| (c) | 0 | 1 | 0 | manipulated | manipulated |
| (d) | 0 | 1 | 1 | manipulated | manipulated |
| (e) | 1 | 0 | 0 | latch engaged belt not put on | manipulated |
| (f) | 1 | 0 | 1 | belt put on correctly | manipulated |
| (g) | 1 | 1 | 0 | belt not put on | manipulated |
| (h) | 1 | 1 | 1 | manipulated | manipulated |

All possible combinations are found in this table so that further explanations are not required. Manipulations may take place in that a voltage is fed to a point of the signal line, and a mechanical force (for example, by means of the jack) is applied to the engaged latch that must exceed the set threshold value (250 kg). However, because of an encased construction of the buckle, a manipulation is made much more difficult. After serious accidents, it will generally not be possible to carry out manipulations before the police arrive to secure the belt buckle for an examination.

Instead of fuses, other destructible indicating elements may also be used, such as diodes or transistors, which are of a capacity that is too low for the output signal of the low-pass filter that, if it is required, may be amplified, and are reliably destroyed by it. However, electrolytic coulomb cells (coulomb meters or volt meters) may also be used which, at the time of the accident, as "operational millisecond counters", store a signal or its duration and thus supply information on the time duration of the signals. As a result, it can also be determined whether a signal was present once or several times.

Although the present invention has been described and illustrated in detail it is to be clearly understood that the same is by way of illustration and example only, and is not to be taken by way of limitation. The spirit and scope of the present invention are to be limited only by the terms of the appended claims.

What is claimed is:

1. Vehicle passenger safety system apparatus for use with a vehicle of the type having safety belt means with a belt buckle and a belt latch selectively lockably engageable at the belt buckle, and having accident indication electrical signal generating means for generating an accident indicating electrical signal in response to the vehicle experiencing forces indicative of a vehicle accident, said safety system apparatus comprising:

lock closure indicating switch means movable between open and closed positions in dependence on whether said belt latch is locked;

first electrical indicating means arranged in series with the lock closure indicating switch means and the accident indicating electrical signal generating means;

belt tension indicating switch means movable between open and closed positions in dependence on belt tension forces exceeding a predetermined value corresponding to forces experienced when a passenger is retained by the seat belt during a vehicle accident;

and second electrical indicating means arranged in series with the belt tension indicating switch means and the accident indicating electrical signal generating means in parallel to the lock closure indicating switch means and first electrical indicating means.

2. Safety system apparatus according to claim 1, further comprising a third indicating element means and a resistor arranged in parallel to the second indicating element means.

3. Safety system apparatus according to claim 2, further comprising a further electrical indicating element means arranged in parallel to the series connection of the lock closure indicating switch means and first electrical indicating means.

4. Safety system apparatus according to claim 3, wherein said switch means and electrical indicating means are arranged in a belt buckle casing such that they and their electrical connection are accessible only after destruction of the belt buckle casing.

5. Safety system apparatus according to claim 4, wherein said electrical indicating means are fuses.

6. Safety system apparatus according to claim 4, wherein said electrical indicating means are electrolytic Coulomb cells in the form of Coulombmeters or voltmeters.

7. Safety system apparatus according to claim 1, further comprising a further electrical indicating element means arranged in parallel to the series connection of the lock closure indicating switch means and first electrical indicating means.

8. Safety system apparatus according to claim 1, wherein said electrical indicating means are fuses.

9. Safety system apparatus according to claim 1, wherein said electrical indicating means are electrolytic Coulomb cells in the form of Coulombmeters or voltmeters.

10. Safety system apparatus according to claim 1, wherein said switch means and electrical indicating means are arranged in a belt buckle casing such that they and their electrical connection are accessible only after destruction of the belt buckle casing.

11. a seat belt system for vehicles comprising:

triggering element means that is triggered when a predetermined acceleration/deceleration threshold value is exceeded;

a lock switch means arranged in a belt buckle that is actuated by a belt latch that engages in said belt buckle;

first electric indicating means, said lock switch and said first electric indicating means being serially connected with each other and connected in series with said triggering means between poles of a voltage source;

pull switch means in said belt buckle which is closed by a predetermined pulling force acting between said belt latch and said belt buckle;

second electric indicating means serially connected to said pull switch means, said second electric indicating means and said pull switch means being connected in parallel to the serial connection of said lock switch means and said first electric indicating means.

* * * * *